United States Patent Office 3,573,095
Patented Mar. 30, 1971

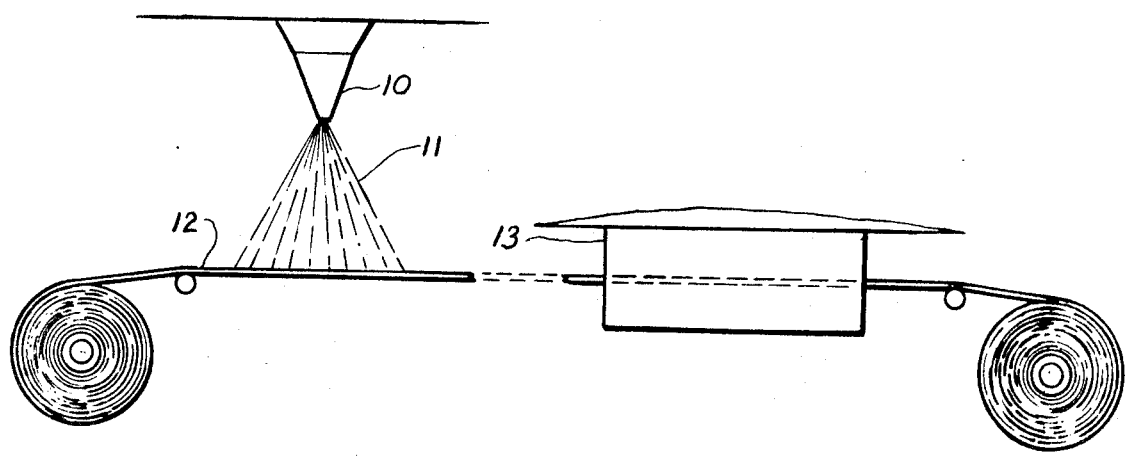

3,573,095
EPOXIDIZED PERFLUOROALKYLAMIDE WATER- AND OIL-REPELLENCY AGENTS
Hans H. Stockmann, Plainfield, and Dilip K. Ray-Chaudhuri and Carmine P. Iovine, Somerset, N.J., assignors to National Starch and Chemical Corporation, New York, N.Y.
Continuation-in-part of abandoned application Ser. No. 622,625, Mar. 13, 1967. This application Oct. 20, 1969, Ser. No. 867,549
Int. Cl. D06m 15/52; C07d 1/04; C08g 23/12
U.S. Cl. 117—161
2 Claims

ABSTRACT OF THE DISCLOSURE

Compositions of matter comprising the products resulting from the reaction of an epihalohydrin with the reaction product of a fluoro carboxylic acid and a polyamine. The resulting epoxidized amide-amine fluoro compounds impart both water and oil repellency to a wide variety of substrates.

RELATED APPLICATION

This application is a continuation-in-part of our application Ser. No. 622,625, filed Mar. 13, 1967, now abandoned, and assigned to the assignee of the subject application.

SUMMARY OF THE INVENTION

It is the object of this invention to prepare novel epoxidized fluoro compounds which when utilized to treat substrates exhibiting either fibrous, porous or continuous surfaces provide said substrates with a high degree of water, oil and soil repellency. Various other objects and advantages of this invention will become apparent to the practitioner from the following description thereof.

DETAILED DESCRIPTION OF THE INVENTION

Thus, the products of the invention comprise the novel epoxidized amide-amine fluoro compounds resulting from the reaction of an epihalohydrin with an intermediate fluoro compound corresponding to the following formula:

$$Z-(X)_y-\overset{O}{\underset{\|}{C}}-NH[(CH_2)_m-NH]_n-\overset{O}{\underset{\|}{C}}-(X)_y-Z$$

wherein

Z is a radical selected from the group consisting of perfluoro alkyl radicals corresponding to the formula $C_sF_{(2s+1)}$ where $s$ is an integer having a value of from 3 to 20 inclusive; and cycloperfluoro alkyl radicals corresponding to the formula $C_tF_{(2t-1)}$ where $t$ is an integer having a value of from 4 to 6 inclusive;

X is a radical selected from the group consisting of straight chain alkylene radicals corresponding to the formula $(CH_2)_p$ where $p$ is an integer having a value of from 2 to 14 inclusive, cycloaliphatic radicals, bridged cycloaliphatic radicals, —CH=CH—(CH$_2$)$_b$—O—(CH$_2$)$_2$— radicals wherein $b$ is an integer having a value of from 0 to 14 inclusive,

—CH$_2$—CH$_2$—(CH$_2$)$_b$—O—(CH$_2$)$_2$— radicals where $b$ is an integer having a value of from 0 to 14 inclusive, —CH=CH—(CH$_2$)$_b$—S—(CH$_2$)$_2$— radicals where $b$ is an integer having a value of from 0 to 14 inclusive, —CH$_2$—CH$_2$—(CH$_2$)$_b$—S—(CH$_2$)$_2$— radicals where $b$ is an integer having a value of from 0 to 14 inclusive, and $$-SO_2-\underset{R}{\underset{|}{N}}-(CH_2)_q- \text{ radicals}$$

where R is an alkyl radical containing from 1 to 6 carbon atoms and $q$ is an integer having a value of from 2 to 12 inclusive;

$y$ is an integer having a value of from 0 to 1 inclusive;
$m$ is an integer having a value of from 2 to 6 inclusive; and
$n$ is an integer having a value of from 2 to 100 inclusive.

It is to be noted that the product initially resulting from the reaction between the epihalohydrin and the above described fluoro intermediate corresponds to the following formula:

$$\left[Z-(X)_y-\overset{O}{\underset{\|}{C}}-NH[(CH_2)_m-\overset{H}{\underset{|}{N}}]_n-\overset{O}{\underset{\|}{C}}-(X)_y-Z \atop \underset{\underset{O}{\diagdown}\underset{CH_2}{|}}{\overset{|}{\underset{CH}{\overset{|}{CH_2}}}} \right]^+ A^-$$

wherein A is a halogen radical and Z, X, $y$, $m$ and $n$ are as previously described. However, as the reaction proceeds, the above described initial reaction product condenses through its epoxide group with additional quantities of the epihalohydrin, thereby assuming a complex polymeric configuration which cannot be accurately depicted.

As previously noted, materials which have been treated with the novel fluoro compounds of this invention exhibit excellent water, oil and soil repellency. Among the primary advantages flowing from the use of these additives are included: (1) the ability to use a single additive in order to acquire a large number of desired properties; (2) the applicability of these additives to a wide variety of substrates, e.g. textiles, paper, etc.; (3) the prolonged retention of the properties imparted by these novel additives despite repeated wet laundering and/or dry cleaning; (4) the ease with which substrates may be treated with these additives; and, (5) the enhanced strength and hand which is also imparted to the thus treated fabrics, etc.

DESCRIPTION OF THE PREFERRED EMBODIMENTS

In brief, the procedure for preparing the novel epoxidized fluoro compounds of this invention comprises reacting: (1) a fluoro carboxylic acid with (2) at least one polyamine compound and, thereafter, reacting the resulting fluoro amide-amine compound with an epihalohydrin.

The fluoro carboxylic acids applicable for use in the process of this invention correspond to the following formula:

$$Z-(X)_y-\overset{O}{\underset{\|}{C}}-OH$$

wherein

Z is a radical selected from the group consisting of perfluoroalkyl radicals corresponding to the formula $C_sF_{(2s+1)}$ in which $s$ is an integer having a value of from 3 to 20 inclusive and cycloperfluoroalkyl radicals corresponding to the formula $C_tF_{(2t-1)}$ in which $t$ is an integer having a value of from 4 to 6 inclusive;

X is a radical selected from the group consisting of straight chain alkylene radicals corresponding to the formula $(CH_2)_p$ is an integer having a value of from 2 to 14 inclusive, cycloaliphatic radicals, bridged cycloaliphatic radicals, $$-CH=CH-(CH_2)_b-O-(CH_2)_2-$$

radicals in which $b$ is an integer having a value of from 0 to 14 inclusive, $$-CH_2-CH_2-(CH_2)_b-O-(CH_2)_2-$$

radicals in which $b$ is an integer having a value of from 0 to 14 inclusive, $$-CH=CH-(CH_2)_b-S-(CH_2)_2-$$

radicals in which $b$ is an integer having a value of from 0 to 14 inclusive, $$-CH_2-CH_2-(CH_2)_b-S-(CH_2)_2-$$

radicals in which $b$ is an integer having a value of from 0 to 14 inclusive, and $$-SO_2-\underset{\underset{R}{|}}{N}-(CH_2)_q- \text{ radicals}$$

in which R is an alkyl radical containing from 1 to 6 carbon atoms and $q$ is an integer having a value of from 2 to 12 inclusive; and, $y$ is an integer having a value of from 0 to 1 inclusive.

Thus, among the applicable fluoro carboxylic acids are included: perfluoro butanoic acid, i.e. $C_3F_7COOH$; perfluoro octanoic acid, i.e. $C_7F_{15}COOH$; omega-perfluoroheptyl pentanoic acid, i.e. $C_7F_{15}(CH_2)_4COOH$; omega-perfluoroheptyl undecanoic acid, i.e. $C_7F_{15}(CH_2)_{10}COOH$; perfluoroheptyl methyl cyclobutane carboxylic acid; perfluoroheptyl substituted norbornene carboxylic acid; omega-perfluoroheptyl-beta-allyloxypropionic acid, i.e. $C_7F_{15}-CH=CH-CH_2-O-(CH_2)_2-COOH$; omega-perfluoroheptyl-beta-propoxypropionic acid, i.e.

$$C_7F_{15}-(CH_2)_3-O-(CH_2)_2-COOH$$

omega-perfluoroheptyl-beta-allylthiopropionic acid, i.e.

$$C_7F_{15}-CH=CH-CH_2-S-(CH_2)_2-COOH$$

omega-perfluoroheptyl-beta-propylthiopropionic acid, i.e.

$$C_7F_{15}-(CH_2)_3-S-(CH_2)_2-COOH$$

and, omega - (N - methyl)-perfluoroheptanesulfonamido hendecanoic acid, i.e.

$$C_7F_{15}-SO_2-\underset{\underset{CH_3}{|}}{N}-(CH_2)_{10}-COOH$$

Although fluoro-substituted carboxylic acids are the preferred acids for use in the novel process of this invention, it should be noted that fluoro-substituted sulfonic acids corresponding to the formula $Z-SO_3H$ wherein Z is as previously described may also be effectively utilized therein. Thus, in the latter instance, the resulting intermediate fluoro compound, which can be readily reacted with an epihalohydrin according to the procedure hereinafter described, would correspond to the formula $$Z-\overset{O}{\underset{O}{\overset{\|}{S}}}-NH[(CH_2)_m-NH]_n-\overset{O}{\underset{O}{\overset{\|}{S}}}-Z$$

wherein Z, $m$ and $n$ are as previously described. The epoxidized fluoro compounds which are eventually prepared from the latter intermediates also impart excellent water and oil repellency to a variety of solid substrates.

The polyamine compounds applicable for use in the process of this invention correspond to the following formula:

$$H_2N-[(CH_2)_m-NH]_nH$$

wherein $m$ is an integer having a value of from 2 to 6 inclusive and $n$ is an integer having a value of from 2 to 100 inclusive. Thus, among the applicable polyamines are included: diethylenetriamine, triethylenetetramine, tetraethylenepentamine and bis-hexamethylenetriamine. It should be noted that more than one of the polyamines corresponding to the above formula may be simultaneously utilized in the reaction system. Thus, if desired, the practitioner may utilize crude residues containing mixtures of amines as the polyamine starting material for the novel process of this invention. It should be further noted that when the above depicted polyamine compound contains two or more primary amine groups and the value of $n$ exceeds about 8, it is highly likely that the resulting polyamine will exhibit a branched configuration; such branched polyamines also being deemed readily applicable for use in the process of this invention.

All available epihalohydrins, e.g. epichlorohydrin and epibromohydrin, may be utilized in the process of this invention, although epichlorohydrin is the preferred reagent for reasons of economy and availability.

In more detail, the procedure for the preparation of the novel epoxidized fluoro compounds of this invention comprises slowly admixing, preferably in an inert atmosphere such as nitrogen, the fluoro carboxylic acid and the polyamine in stoichiometric proportion and thereafter heating the resulting mixture at a temperature of from about 40 to 250° C. for a period of about ¼ to 3 hours while simultaneously distilling off the water that is formed during the course of the reaction. It should be noted that variations in temperature and pressure may be used in order to either increase or decrease the duration of the reaction period. Additionally, the polyamine may be dissolved in small amounts of water in order to facilitate the reaction procedure.

The resulting fluoro amide-amine products are thereafter cooled to a temperature of from about 25 to 100° C. depending on the melting point of the particular product. In most instances, the resulting reaction product is a low melting, yellow-brown solid which is soluble in such organic solvents as methanol and acetone. These intermediate products are also novel compositions of matter and can be utilized as cationic surfactants as well as non-durable oil repellency agents.

Thereafter, the above prepared intermediate product is melted and the selected epihalohydrin is slowly added thereto over a period of about 10 to 30 minutes. The reaction temperature is then raised to about 50 to 150° C. and maintained at the level for a period of from about ¼ to 3 hours. The completion of the reaction is indicated by an increase in the viscosity of the system and a simultaneous substantial decrease in the vigor with which the epihalohydrin is refluxing. The physical characteristics of the resulting epoxidized fluoro compound are, in most instances similar to those of the amide-amine intermediate.

With respect to proportions, the determination of the precise concentration of the three primary ingredients in relation to one another, as based on the stoichiometric equivalencies of the reaction, is left to the discretion of the practitioner and will depend, of course, on the characteristics which are desired in the ultimate end product. Typical concentration values, however, include the reaction of 2 moles of the fluoro carboxylic acid with approximately one mole of the polyamine and, thereafter, reacting the resulting intermediate product with from about 0.5 to 2.0 moles of epihalohydrin for each secondary nitrogen atom present in the amide-amine intermediate.

It should be noted that these reaction procedures are suitable for use with any fluoro carboxylic acids and polyamine compounds that correspond to the formulae depicted hereinabove, in order to prepare fluoro amide-amine products and epoxidized fluoro compounds in accordance with this invention.

The novel additives of this invention may be effectively utilized to treat a virtually unlimited variety of solid materials regardless of whether they exhibit fibrous, porous or continuous surfaces. Among such materials are included: textiles derived from wool, cotton, polyester, nylon, polyacrylonitrile and other synthetic fibers, glass, paper, wood, leather, fur, asbestos, brick, concrete, metal, ceramics, plastics as well as painted and plastered surfaces. Thus, for purposes of convenience, when reference is hereinafter made to "applying to" or to "treating" or the "treatment" of such substrates, the latter terms are meant to encompass both the coating and/or impregnation of porous substrates as well as the coating of impervious substrates.

The latter materials may be treated by means of any effective technique whose use is desired by the practitioner. Thus, textiles are typically treated by a "padding" technique wherein the textile is passed through an organic solvent solution of a novel fluorochemical product of this invention, squeezed through a nip and then briefly heated to evaporate the solvent. Typical organic solvents include isopropanol, acetone, methyl ethyl ketone, etc. The treated textile is subsequently cured by heating at a temperature of from about 60 to 180° C. for a period of about 5 to 10 minutes, thereby developing total water and oil repellency. In addition, such surface coating techniques as spraying and brushing may also be effectively utilized in order to deposit a film of the repellent on the surface of the substrate. The amount of additive which is required to provide adequate water, oil and soil repellency will vary according to the particular fluorochemical product being used, the selected substrate and the specific end-use application of the resulting treated product, although the presence of as little as about 0.1% of the additive, based on tthe weight of the substrate, will ordinarily provide adequately improved water and oil repellency. On the other hand, it may be noted that there is no particular advantage to be derived from utilizing more than about 6% of repellent, based on the weight of substrate, since the increased expense thus incurred far outweighs the increase in repellency which may be obtained thereby.

In addition, blends of water with one or more of the above specified organic solvents may be used to dissolve either intermediate fluoro compounds or epihalohydrin-reaction polymeric compositions which do not contain an X component, the resulting solution having the ability to impart oil repellency to a wide variety of solid substrates, notably paper.

For application to substrates any means for effectively depositing a requisite small amount of the repellent will do. The figure illustrates a spray technique wherein, nozzle 10 sprays solution 11 of repellent onto substrate 12 which passes through drier 13 to remove solvent.

The following examples will further illustrate the embodiment of this invention. In these exampes all parts given are by weight unless otherwise noted.

EXAMPLE I

This example illustrates the preparation of an epoxidized fluoro compound typical of the products of this invention.

A reaction vessel fitted with a nitrogen inlet, a distillation apparatus and means for mechanical agitation was charged with 50 parts of perfluoro octanoic acid. The acid was slowly cooled to 5° C. while the system was provided with a nitrogen atmosphere. Thereupon, 12.35 parts of tetraethylene-pentamine was added to the system over a 15 minute period and the resulting mixture was heated to a temperature of 120° C. over a period of 60 minutes. The reaction proceeded at this temperature for a period of 120 minutes during which time the water formed as a by-product of the reaction was distilled out of the system. The resulting product, i.e. the di-N-pentadecafluorooctanoyl tetraethylenepentamine, was in the form of a hard brown solid which melted at a temperature of 40°–50° C.

Thereafter, 11.2 parts of epichlorohydrin was added, over a 10 minute period, to 23.7 parts of the above prepared amide-amine intermediate which had been maintained at room temperature. The temperature of the system was increased to 100–105° C. over a 30 minute period and the reaction was allowed to proceed at this temperature for an additional 30 minutes whereupon an increase in viscosity and a decrease in the vigor with which the epichlorohydrin was refluxing were noted. The epoxidized fluoro compound thus obtained had a melting point in the range of 60–65° C. and a 5.9% nitrogen content.

EXAMPLE II

This example illustrates the preparation of another epoxidized fluoro compound typical of the products of this invention.

A reaction vessel fitted with a nitrogen inlet, a distillation apparatus and means for mechanical agitation was provided with a nitrogen atmosphere and thereafter charged with 5.5 parts of omega-perfluoropropyl undecanoic acid and a heated solution of 1.45 parts of tetra-ethylenepentamine in 5 parts of water. The temperature of the reaction system was raised to 190° C. over a period of 90 minutes and the reaction allowed to proceed at this temperature for an additional hour. The water which formed during the course of the reaction was continuously distilled from the system. The resulting product, i.e. the di - N - (omega-perfluoropropyl) undecanoyl tetraethylene-pentamine, was in the form of a viscous yellow liquid.

The amide-amine intermediate was then cooled to 50° C. whereupon 1.97 parts of epichlorohydrin were added thereto. The reaction mixture was heated, over a 90 minute period, to a temperature of 110° C. and maintained at that temperature for an additional 60 minutes. The epoxidized fluoro compound thus obtained was in the form of a low melting solid, i.e. melting point 24–25° C., which had a 5.7% nitrogen content and was readily soluble in methanol.

EXAMPLES III–VIII

These examples illustrate the wide variety of reagents and reaction conditions which can be efficiently utilized in the novel process of this invention.

A number of different epoxidized fluoro compounds were prepared, according to the general procedure of Example II, utilizing a variety of reagents at different concentration levels and under varying reaction conditions. These variables are presented in the following table wherein "Step 1" refers to the preparation of the amide-amine intermediate and "Step 2" refers to the preparation of the epoxidized reaction product.

| | Parts Example No. | | | | | |
|---|---|---|---|---|---|---|
| | III | IV | V | VI | VII | VIII |
| Step 1: | | | | | | |
| (1) Omega-perfluoroheptyl undecanoic acid | 10.0 | | 11.5 | 8.04 | | |
| (2) Omega-perfluoroheptyl pentanoic acid | | 8.0 | | | | |
| (3) Perfluoro octanoic acid | | | | | 10.0 | 10.0 |
| (4) Tetraethylenepentamine | 1.7 | 1.76 | | | | |
| (5) Diethylenetriamine | | | 1.06 | | | |
| (6) Bis-hexamethylenetriamine | | | | 1.7 | 2.58 | |
| (7) A polyethylene amine residue comprising the non-volatile amine by-product of the reaction between ethylene dichloride and ammonia | | | | | | 3.5 |
| (8) Water | | 10.0 | | 5.0 | 5.0 | 5.0 |
| (a) Total reaction time (minutes) | 120 | 180 | 75 | 150 | 100 | 100 |
| (b) Reaction temperature (° C.) | 200 | 200 | 200 | 175 | 140–150 | 140–150 |

|  | Parts | | | | | |
|---|---|---|---|---|---|---|
|  | Example No. | | | | | |
|  | III | IV | V | VI | VII | VIII |
| Step 2: | | | | | | |
| (1) Di-N-(omega perfluoroheptyl)undecanoyl tetraethylenepentamine (soft brown wax) | 12.0 | | | | | |
| (2) Di-N-(omega-perfluoroheptyl)pentanoyl tetraethylenepentamine (brown solid) | | 9.5 | | | | |
| (3) Di-N-(omega-perfluoroheptyl)undecanoyl diethylenetriamine (light brown wax) | | | 12.5 | | | |
| (4) Di-N-(omegaperfluoroheptyl)undecanoyl bis-hexamethylene triamine (light brown solid) | | | | 9.5 | | |
| (5) Di-N-perfluorooctyl-bis-hexamethylene-triamine (yellow paste) | | | | | 12.5 | |
| (6) Amine residue reaction product (hard brown solid) | | | | | | 13.5 |
| (7) Epichlorohydrin | 2.68 | 2.50 | 2.05 | 1.11 | 1.66 | 3.90 |
| (a) Epichlorohydrin addition period (minutes) | 10 | 10 | 10 | | | 10 |
| (b) Total reaction time (minutes) | 60 | 75 | 40 | 45 | 20 | 60 |
| (c) Reaction temperature (° C.) | 80–85 | 80 | 90 | 125–130 | 120 | 105–110 |
| (d) Melting point of epoxidized product (° C.) | 33–36 | 30–32 | 50–55 | 50–52 | 25–26 | 75–92 |
| (e) Percent nitrogen | 4.1 | 9.7 | 3.3 | 3.1 | 3.1 | 7.3 |

The data presented hereinabove clearly indicate the effectiveness of the novel process of this invention in the utilization of a wide range of reagents and reaction conditions.

EXAMPLES IX–XI

These examples further illustrate the wide variety of reagents and reaction conditions which can be efficiently utilized in the novel process of this invention.

Thus, a number of additional epoxidized fluoro compounds were prepared, according to the general procedure of Example H, utilizing a variety of reagents at different concentration levels and under varying reaction conditions. These variables are presented in the following table wherein "Step 1" refers to the preparation of the amide-amine intermediate and "Step 2" refers to the preparation of the epoxidized reaction product.

|  | Parts | | |
|---|---|---|---|
|  | Example No. | | |
|  | IX | X | XI |
| Step 1: | | | |
| (1) Ethyl-5-perfluoroheptyl-norbornane-2-carboxylate | 18.7 | | |
| (2) S-(1H,1H,2H,2H-perfluorononyl)-beta-thiopropionic acid | | 23.8 | |
| (3) Beta-(3-perfluoroheptyl allyl-oxy)-propionic acid | | | 15 |
| (4) Bishexamethylenetriamine | 3.75 | | |
| (5) Tetraethylenepentamine | | 4.5 | |
| (6) Diethylenetriamine | | | 1.75 |
| (7) Methanol | | | 15 |
| (8) Aluminum iso-propoxide | 0.11 | | |
| (a) Total reaction time (minutes) | 300 | 180 | 180 |
| (b) Reaction temperature (° C.) | 145–150 | 145 | 150 |
| Step 2: | | | |
| (1) Di-N-(5-perfluoroheptyl-norbornan-2-oyl)-bis-hexamethylenetriamine | 9 | | |
| (2) Di-N-[S-(1H,1H,2H,2H-perfluorononyl)-beta-thiopropionyl]tetraethylenepentamine | | 28 | |
| (3) Di-N-(3-perfluoroheptyl allyloxy)-propionyl diethylenetriamine | | | 16.8 |
| (4) Epichlorohydrin | 0.7 | 6.85 | 1.7 |
| a. Epichlorohydrin addition period (minutes) | 2 | 10 | 5 |
| b. Total reaction time (minutes) | 45 | 60 | 37 |
| c. Reaction temperature (° C.) | 75 | 75 | 75–80 |
| d. Melting point of epoxidized product (° C.) | 48–50 | 29–30 | 62–70 |
| e. Percent nitrogen | 3.2 | 5.6 | 3.9 |

The data presented hereinabove further indicate the effectiveness of the novel process of this invention in the utilization of a wide range of reagents and reaction conditions.

EXAMPLE XII

This example illustrates the excellent water and oil repellent properties exhibited by substrates which have been treated with the novel epoxidized fluoro compounds of this invention.

In order to demonstrate the excellent water and oil repellent characteristics of the novel derivatives of this invention, the following testing procedures were employed. In each instance, the cotton print cloth that was used as the textile sample was treated by means of a padding technique wherein the sample was passed through an isopropanol solution of the selected derivative, squeezed through a nip, heated at a low temperature to evaporate the solvent and thereafter heated at a temperature of 150° C. for a period of 5 minutes in order to cure the thus treated fabric.

Oil repellency: The oil repellency of the treated cotton fabrics was measured by use of the "3M Oil Repellency Test," the latter procedure being fully described on page 323 of the April 1962 issue of the Textile Research Journal. In this procedure, an 8" x 10" swatch of the treated cotton, which had been conditioned at a temperature of 70° F. and a relative humidity of 65% for a period of 4 hours, was securely fastened to a 5" hoop in order to provide a smooth wrinkle-free surface. Single drops of testing oils, which comprised varying mixtures of mineral oil (Nujol) and n-heptane were gently placed upon the fabric and after a three minute period, the fabric was visually studied in order to observe the extent of wetting and penetration. An oil repellency rating, as defined in the following table, was then assigned to each fabric, this rating corresponding to the composition of the particular oil mixture which contained the highest percentage of heptane and which did not penetrate or wet the fabric.

| Oil repellency rating: | Volume percent of mineral oil | Volume percent of heptane |
|---|---|---|
| 120 | 30 | 70 |
| 110 | 40 | 60 |
| 100 | 50 | 50 |
| 90 | 60 | 40 |
| 80 | 70 | 30 |
| 70 | 80 | 20 |
| 50 | 100 | 0 |
| 0 | (¹) | (¹) |

¹ No resistance to mineral oil.

It is to be noted that ratings of 70 and above are indicative of effective oil repellency.

Water repellency: The water repellency of the treated cotton fabrics was measured by use of the "Standard Spray Test" of the American Association of Textile Chemists and Colorists—AATCC No. 22-1964. In this procedure, the cotton samples which were used were prepared according to the method described hereinabove in the "Oil Repellency Test." The swatch was then securely fastened to a 6" hoop so that it presented a smooth wrinkle-free surface. The test sample was positioned at a 45° angle with a spray nozzle and its center aligned with the center of the spray pattern. Thereupon, 250 ml. of distilled water were sprayed onto the sample over a period of 25–30 seconds. The wet pattern which formed on the surface of the test sample was compared with a series of rated standard wet patterns. Each test sample was then assigned the rating of the standard pattern which most clearly approximated the pattern on the test sample.

The sandard patterns were rated according to the following scheme:

100—no sticking or wetting of upper surface
90—slight random sticking or wetting of upper surface
70—partial wetting of whole of upper surface
50—complete wetting of whole of upper surface
0—complete wetting of whole of upper and lower surfaces The results of these determinations are presented in the following table:

| Repellent (Example No.) | Percent of repellent [1] | Oil rating | Spray rating |
|---|---|---|---|
| Control [2] | | 0 | 0 |
| I | 0.7 | 100 | 70 |
| II | 0.7 | 100 | 70 |
| III | 0.7 | 100 | 70 |
| IV | 0.7 | 100 | 70 |
| V | 0.7 | 100 | 70 |
| VI | 0.3 | 80 | 50 |
| VI | 0.5 | 100 | 70 |
| VI | 0.7 | 110 | 90 |
| VI | 1.0 | 120 | 100 |
| VII | 0.7 | 100 | 70 |
| VIII | 0.7 | 80 | 50 |

[1] As based on weight of cotton fabric.
[2] Untreated cotton swatch.

The results summarized above thus clearly show the excellent oil and water repellency exhibited by the novel epoxidized fluoro compounds of this invention.

Summarizing, it is thus seen that the process of this invention provides for the preparation of novel epoxidized fluoro compounds which display excellent water, oil and soil repellency properties.

Variations may be made in proportions, procedures and materials without departing from the scope of this invention which is defined by the following claims.

What is claimed is:
1. The polymeric product of the reaction of an epihalohydrin with an intermediate fluoro compound corresponding to

$$Z-(X)_y-\overset{O}{\underset{\|}{C}}-NH[(CH_2)_m-NH]_n-\overset{O}{\underset{\|}{C}}-(X)_y-Z$$

wherein

Z is a radical selected from the group consisting of perfluoro alkyl radicals corresponding to the formula $C_sF_{(2s+1)}$ where $s$ in an integer having aa value of from 3 to 20 inclusive; and cycloperfluoro alkyl radicals corresponding to the formula $C_tF_{(2t-1)}$ where $t$ is an integer having a value of from 4 to 6 inclusive;

X is a radical selected from the group consisting of straight chain alkylene radicals corresponding to the formula $(CH_2)_p$ where $p$ is an integer having a value of from 2 to 14 inclusive, cycloaliphatic radicals, bridged cycloaliphatic radicals, $$-CH=CH-(CH_2)_b-O-(CH_2)_2-$$

radicals wherein $b$ is an integer having a value of from 0 to 14 inclusive, $$-CH_2-CH_2-(CH_2)_b-O-(CH_2)_2-$$

radicals where $b$ is an integer having a value of from 0 to 14 inclusive, $-CH=CH-(CH_2)_b-S-(CH_2)_2-$ radicals where $b$ is an integer having a value of from 0 to 14 inclusive, $-CH_2-CH_2(CH_2)_b-S-(CH_2)_2-$ radicals where $b$ is an integer having a value of from 0 to 14 inclusive, and

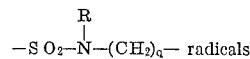

where R is an alkyl radical containing from 1 to 6 carbon atoms and $q$ is an integer having a value of from 2 to 12 inclusive;
$y$ is an integer having a value of from 0 to 1 inclusive;
$m$ is an integer having a value of from 2 to 6 inclusive; and
$n$ is an integer having a value of from 2 to 100 inclusive.

2. A solid substrate exhibiting water and oil repellency which has been treated on at least one surface thereof with a polymeric composition comprising the reaction product of an epihalohydrin with an intermediate fluoro compound corresponding to $$Z-(X)_y-\overset{O}{\underset{\|}{C}}-NH[(CH_2)_m-NH]_n-\overset{O}{\underset{\|}{C}}-(X)_y-Z$$

wherein

Z is a radical selected from the group consisting of perfluoro alkyl radicals corresponding to the formula $C_sF_{(2s+1)}$ where $s$ is an integer having a value of from 3 to 20 inclusive; and cycloperfluoro alkyl radicals corresponding to the formula $C_tF_{(2t-1)}$ where $t$ is an integer having a value of from 4 to 6 inclusive;

X is a radical selected from the group consisting of straight chain alkylene radicals corresponding to the formula $(CH_2)_p$ where $p$ is an integer having a value of from 2 to 14 inclusive, cycloaliphatic radicals, bridged cycloaliphatic radicals, $$-CH=CH-(CH_2)_b-O-(CH_2)_2-$$

radicals wherein $b$ is an integer having a value of from 0 to 14 inclusive, $$-CH_2-CH_2-(CH_2)_b-O-(CH_2)_2-$$

radicals where $b$ is an integer having a value of from 0 to 14 inclusive, $-CH=CH-(CH_2)_b-S-(CH_2)_2-$ radicals where $b$ is an integer having a value of from 0 to 14 inclusive, $$-CH_2-CH_2-(CH_2)_b-S-(CH_2)_2-$$

radicals where $b$ is an integer having a value of from 0 to 14 inclusive, and

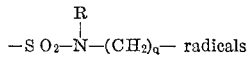

where R is an alkyl radical containing from 1 to 6 carbon atoms, and $q$ is an integer having a value of from 2 to 12 inclusive;
$y$ is an integer having a value of from 0 to 1 inclusive;
$m$ is an integer having a value of from 2 to 6 inclusive; an!
$n$ is an integer having a value of from 2 to 100 inclusive.

References Cited
UNITED STATES PATENTS
3,382,096  5/1968  Boardman _____ 117—139.5
3,420,697  1/1969  Sweeney et al. _____ 117—139.3

WILLIAM D. MARTIN, Primary Examiner
D. COHEN, Assistant Examiner

U.S. Cl. X.R.

117—70, 126, 138.8, 139.5, 141, 142, 143, 148, 155; 260—2, 348